(12) United States Patent
Zoppas et al.

(10) Patent No.: US 8,544,636 B2
(45) Date of Patent: Oct. 1, 2013

(54) CHUCK

(75) Inventors: Matteo Zoppas, Conegliano (IT); Adrian Grando, Mareno di Piave (IT)

(73) Assignee: S.I.P.A. Societa' Industrializzazione Progettazione e Automazione S.p.A., Vittorio Veneto (IT)

(*) Notice: Subject to any disclaimer, the term of this patent is extended or adjusted under 35 U.S.C. 154(b) by 219 days.

(21) Appl. No.: 13/054,112

(22) PCT Filed: Jul. 17, 2009

(86) PCT No.: PCT/EP2009/059219
§ 371 (c)(1),
(2), (4) Date: Jan. 14, 2011

(87) PCT Pub. No.: WO2010/007158
PCT Pub. Date: Jan. 21, 2010

(65) Prior Publication Data
US 2011/0114452 A1 May 19, 2011

(30) Foreign Application Priority Data

Jul. 18, 2008 (IT) .............................. RM2008A0390

(51) Int. Cl.
*B65G 47/84* (2006.01)
*B29C 49/42* (2006.01)

(52) U.S. Cl.
USPC ............. 198/803.14; 198/377.07; 198/803.15

(58) Field of Classification Search
USPC .................. 198/377.03, 377.07, 803.3, 803.9, 198/803.12, 803.14, 803.15
See application file for complete search history.

(56) References Cited

U.S. PATENT DOCUMENTS

| | | | | |
|---|---|---|---|---|
| 3,771,284 A * | 11/1973 | Boeckmann et al. | ............ | 53/282 |
| 4,082,175 A * | 4/1978 | Gibbemeyer | ............. | 198/377.02 |
| 4,116,325 A * | 9/1978 | McDonald | ................. | 198/482.1 |
| 4,280,612 A * | 7/1981 | Nagano | .......................... | 198/379 |
| 4,435,146 A * | 3/1984 | Wiatt et al. | .................... | 425/534 |
| 4,678,425 A * | 7/1987 | Gibbemeyer | ................. | 425/522 |
| 5,035,603 A | 7/1991 | Unterlander et al. | | |
| 5,150,782 A * | 9/1992 | Richter | .......................... | 198/394 |
| 5,201,984 A | 4/1993 | Bedin | | |
| 5,660,902 A | 8/1997 | Unterlander | | |
| 5,816,029 A * | 10/1998 | Sweeny | .......................... | 53/490 |
| 5,853,775 A | 12/1998 | Oas | | |
| 6,308,816 B1 * | 10/2001 | Bankuty et al. | ................ | 198/395 |
| 6,848,564 B2 * | 2/2005 | Nickey et al. | ................. | 198/379 |
| 7,025,193 B2 * | 4/2006 | Zoppas et al. | ............ | 198/377.03 |
| 7,442,031 B2 * | 10/2008 | Netsu | .............................. | 425/526 |
| 7,870,943 B2 * | 1/2011 | Malini | ............................ | 198/376 |
| 7,921,980 B2 * | 4/2011 | Eder et al. | ...................... | 198/379 |

FOREIGN PATENT DOCUMENTS

| | | |
|---|---|---|
| DE | 41 25 666 | 12/1992 |
| FR | 2 537 903 | 6/1984 |
| JP | 61-045310 | 3/1986 |

* cited by examiner

*Primary Examiner* — Douglas Hess
(74) *Attorney, Agent, or Firm* — Abelman, Frayne & Schwab

(57) ABSTRACT

A chuck for actuating plastic material containers, in particular performs, along a conveying line, includes a structure, fixable to a link of a conveying chain, a body, defining a longitudinal axis, inserted into a longitudinal through-hole of the structure and adapted to axially slide and/or rotate about the longitudinal axis, provided with gripping means at a first end for gripping a container neck. The structure is provided with locking elements for locking the body in a predetermined angular position, with the body being provided with at least one indication element of the predetermined angular position.

10 Claims, 10 Drawing Sheets

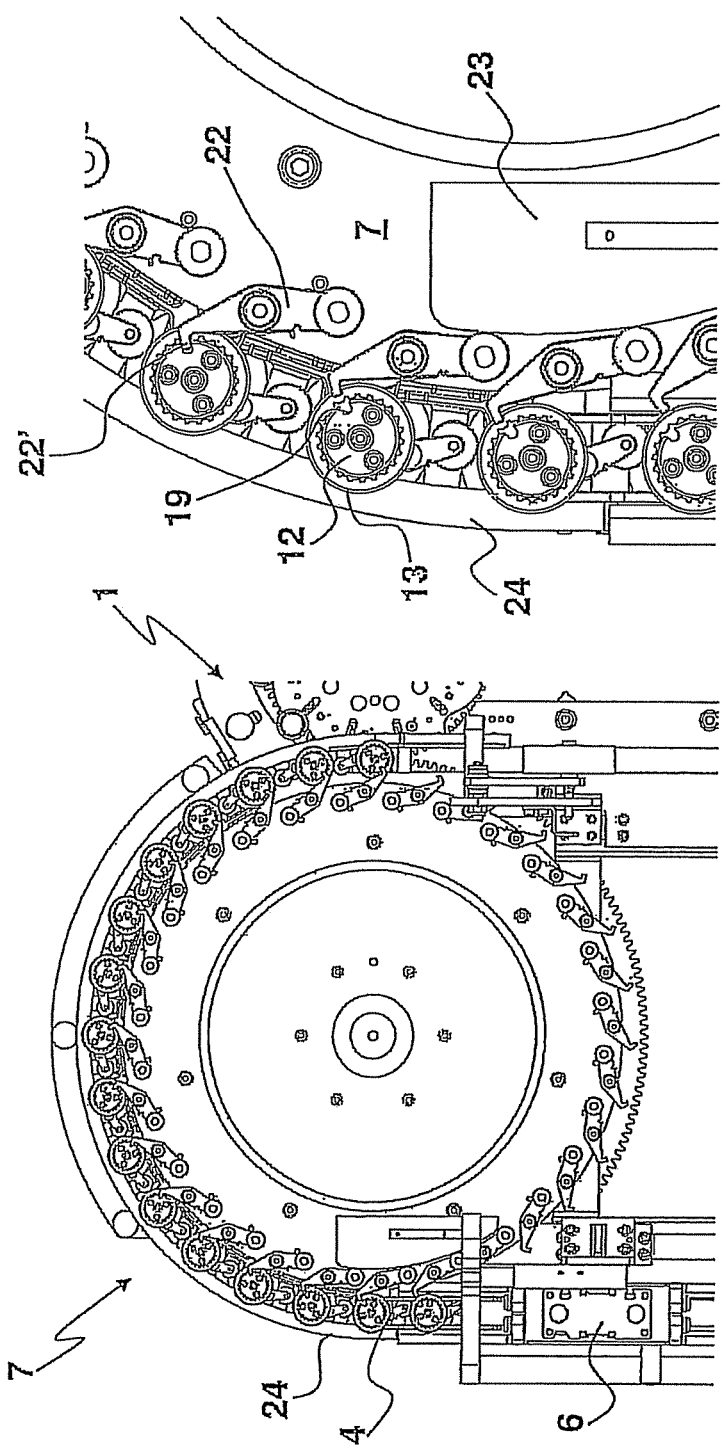

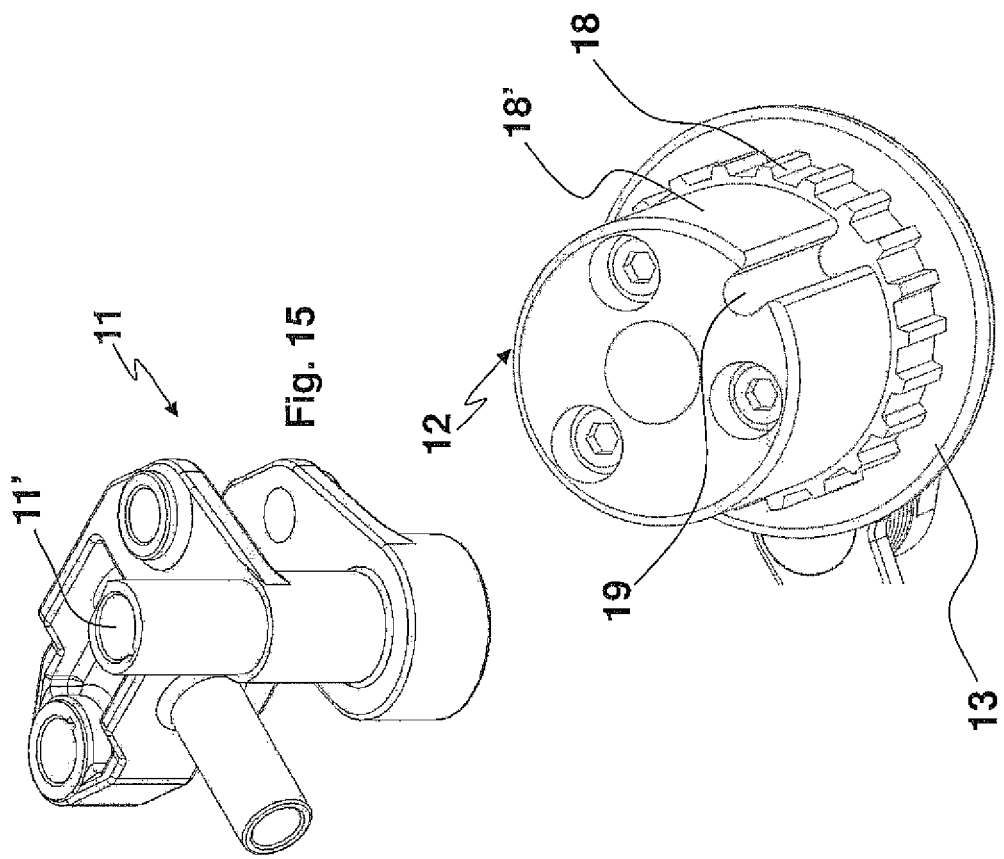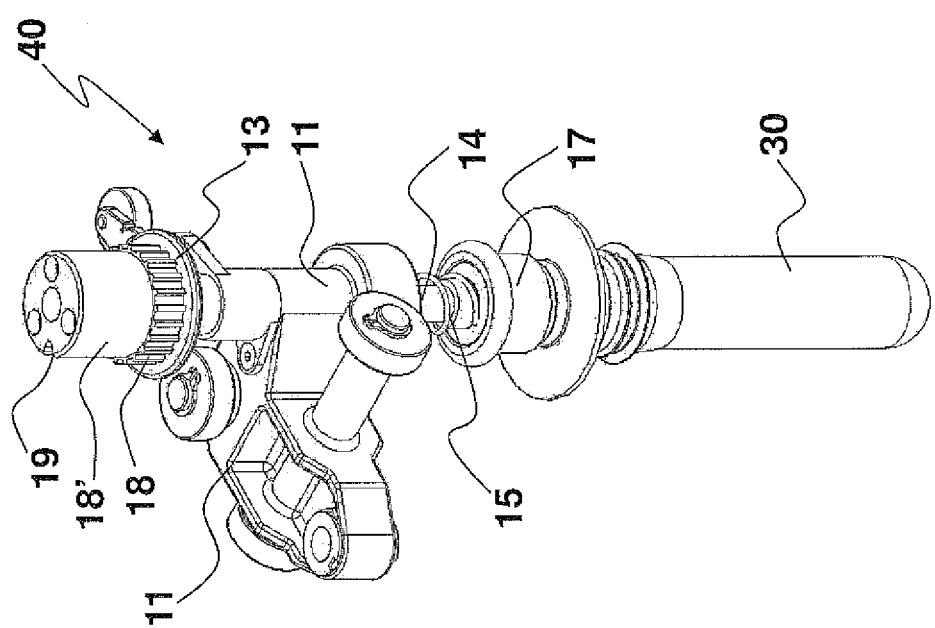

CHUCK

CROSS-REFERENCE TO RELATED APPLICATIONS

This application is a National Phase of PCT/EP2009/059219 filed Jul. 17, 2009 which claims priority from Italian Application No. RM2008A000390 filed Jul. 18, 2008, both of which are incorporated herein by reference thereto.

FIELD OF THE INVENTION

The present invention relates to a chuck for quickly fastening and actuating plastic material containers, in particular preforms, to be used on a conveying chain of said containers.

STATE OF THE ART

The need to arrange the preforms at a predetermined angular orientation in a production process exists, for example, in the production of containers, made of PET or other plastic materials, by blow molding, when the preforms need to be transferred from the injection molding station, where they were obtained, to the blow molding station, where the container is formed.

For particular types of containers—e.g. for detergent containers with a cap acting as dispenser or sprayer, garden sprayers and, more in general, bottles or containers with caps which are not shaped as a solid of revolution—the cap, once screwed onto the threaded neck of the blown container, must be in a precise angular position with respect to the container itself, which requires the preforms to be inserted in the blowing mold with an accurate, not random orientation of the thread with respect to the mold itself.

If the preforms need to be freely rotated when fed towards the blowing machine, e.g. in the heating ovens, orientation systems for said preforms are thus included to obtain the predetermined orientation before insertion into the molds.

The need to arrange previously blown containers at a predetermined angular orientation in a production process exists, for example, in processes for applying labels or printing letters and/or logos on asymmetric containers.

Various orientation systems for the preforms or containers are known, but these are not an optimal solution.

For example, solutions with identification of the notch on the neck of the preform or container by means of a laser device or photocell are known. This solution does not disadvantageously allow to obtain an accurate orientation: the device requires maximum stability, and thus absence of vibrations, and acts on fields of measures close to 0.1 mm. The notch is further identified by means of complex, very expensive electronic devices.

Another solution includes screwing the chuck on the neck, the chuck serving the function as a cap. The adopted machine is however very complex and customization costs are high. The complex mechanics and "slow" movements further reduces the productive performance of the machine.

Other solutions include orienting the preform only during the final step of conveying, i.e. immediately before the insertion of the preform in the blowing mold. These solutions disadvantageously require very high precision mechanics, are characterized by "slow" movements and thus low productivity, and considerably reduce the action range, i.e. the types of neck to be oriented.

Furthermore, other solutions which provide for the orientation of the preform and container only during the final step of conveying do not ensure to keep the orientation during the transfer of the preform and container to both the mold and the zone for applying labels or printing letters and/or logos, respectively.

It is thus felt the need to provide novel chucks and a conveying chain provided with a plurality of said chucks which allow to simplify the angular orientation of preforms and containers in conveying systems.

SUMMARY OF THE INVENTION

It is the primary object of the present invention to provide a chuck for quickly fastening and actuating plastic material containers, in particular preforms, to be used on conveying chains of said containers, and provided with particular devices for simply and cost-effectively allowing, for example, the angular orientation of the preforms from the step of loading onto a conveying line to the step of blowing the containers in a blowing machine, or for example the angular orientation of previously blown, asymmetric containers for transferring said containers to zone for applying labels or printing letters and/or logos.

A further object of the invention is to provide a conveying chain of containers, in particular preforms, comprising links adapted to accommodate the aforesaid chuck and provided with means for angularly orienting the latter.

Therefore, the present invention suggests to reach the aforesaid object by providing a chuck for actuating plastic material containers, in particular preforms, along a conveying line which, in accordance with claim 1, comprises:
   a structure, fixable to a link of a conveying chain,
   a body defining a longitudinal axis, inserted into a longitudinal through hole of said structure and adapted to axially slide and/or rotate about said axis, provided with gripping means at a first end for gripping a container neck,
wherein the structure is provided with locking means for locking said body in a predetermined angular position,
and wherein the body is provided with at least one indication element of said predetermined angular position.

A further aspect of the present invention includes a conveying chain for plastic material containers, in particular preforms, which, in accordance with claim 10, comprises a plurality of links, in which respective chucks are fixed in at least some of said links according to any one of the preceding claims.

The chucks for gripping the containers, in particular preforms, object of the present invention, are accommodated on at least some links of the conveying chain.

Said chucks comprise a set of reciprocally and integrally fixed elements movable with respect to the body of the link of the conveying chain. These elements comprise a rotation pinion, a lifting plate, a rotation pin and a quick fastening end of the preform neck.

The rotation pinion serves two specific functions:
   it allows the rotation of the preform during the whole step of heating, i.e. while crossing the ovens, for example;
   and it allows the angular orientation thereof by means of a notch placed on the side surface thereof. The function of the notch is to identify the precise position of the pinion as well as of the rotation pin, and thus of the plastic container to be transported in a first step of conveying.

The lifting plate serves three specific functions:
   it allows the rotation pin to be lifted after having released the preform by means of a specific mechanical cam system, so as to avoid any interference between the neck of the preform once it has been ejected from the chuck;

it allows the rotation of the rotation pin if the set consisting of the pinion, the lifting plate and the pin itself is present in a lifted position, after having released the preform during its transfer towards the cooperation zone with the loading drum;

it allows the angular orientation thereof by means of a notch placed on its side surface. The function of the latter notch is to identify the precise position of the chuck and thus of the preform integral therewith in a second step of conveying before it is released.

The rotation pin, mechanically secured to the pinion and the lifting plate, serves the function of rotating and either raising or lowering the quick fastening end and everything mechanically connected thereto.

A spring, arranged between the quick fastening end and the body of the chain link is compressed when lifting the rotation pin, and thus allows the quick descent of the latter once the lifting plate has been released close to the cooperation zone with the loading drum.

The advantages of using chucks according to the present invention include:

the possibility of simply changing the orientation angle;

more safety and robustness, with better orientation control and no damage to the preform because nearly all the orientation operations are carried out on mechanical parts and not on the preform;

completely keeping the orientation during the transfer, as the preforms, once oriented, are "positively" gripped and thus the preform may not rotate or loose the final orientation position.

The dependent claims describe preferred embodiments of the invention.

BRIEF DESCRIPTION OF THE FIGURES

Further features and advantages of the present invention will be apparent in the light of the detailed description of a preferred, but not exclusive, embodiment of a chuck and corresponding conveying chain comprising a plurality of chucks illustrated by way of non-limitative example, with the aid of the accompanying drawings, in which:

FIG. 6 is a top view of a wheel of the conveying line of the system in FIG. 1;

FIG. 7 is an enlarged view of part of the view in FIG. 6;

FIG. 14 is an axonometric view of a link with a preform fastened to the chuck;

FIG. 15 is an axonometric view of the body of a chain link;

FIG. 16 is an enlarged view of a component of the chuck of the invention.

DETAILED DESCRIPTION OF PREFERRED EMBODIMENTS OF THE INVENTION

Figure 1:
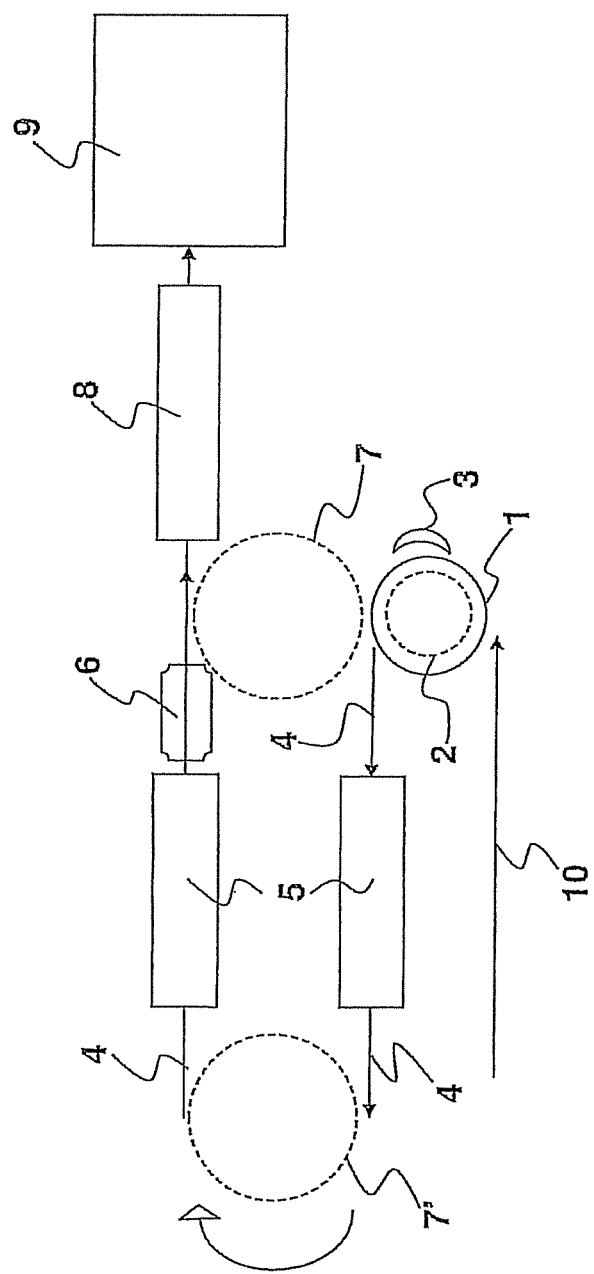
FIG. 1 is a diagrammatic layout of part of a preform conveying system.
Figure 2A:
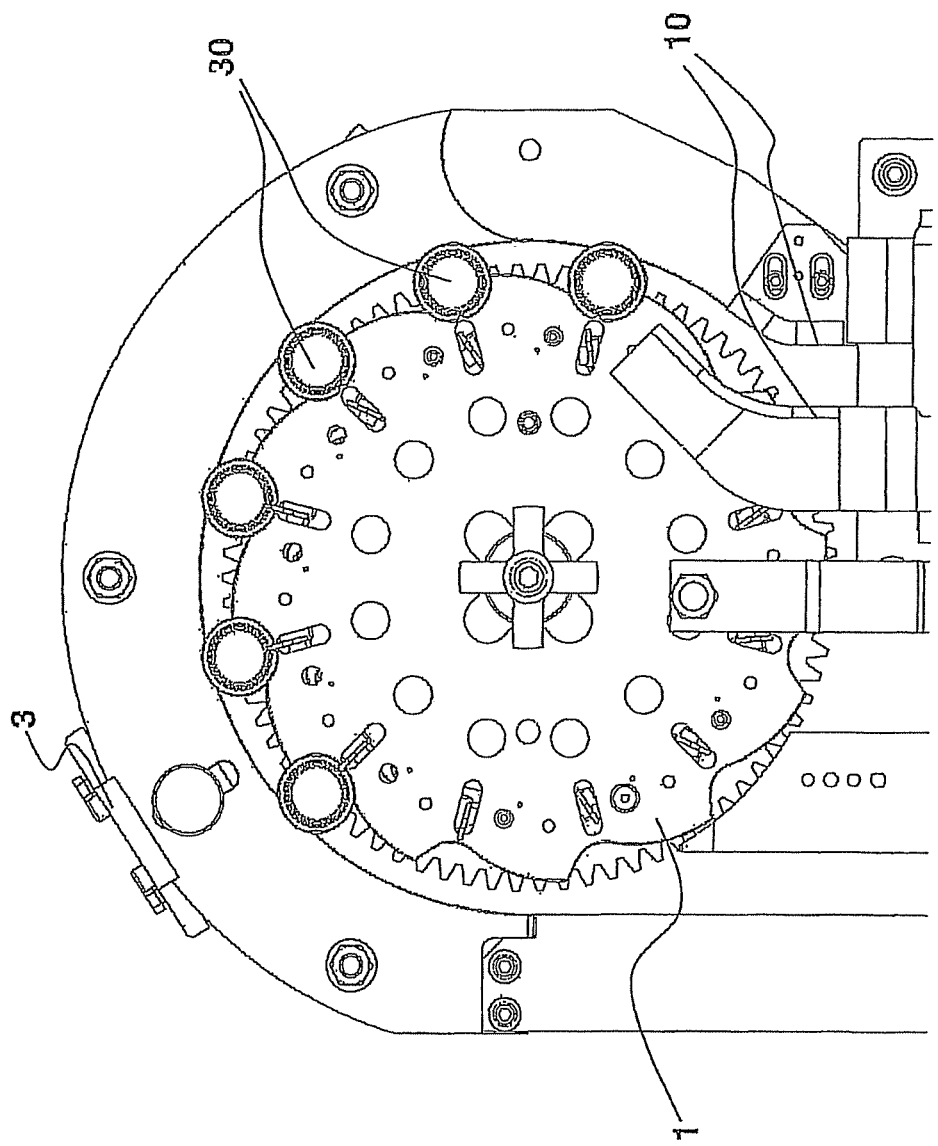
FIG. 2a is a top view of the loading drum of the conveying line of the system in FIG. 1.
Figure 2B:
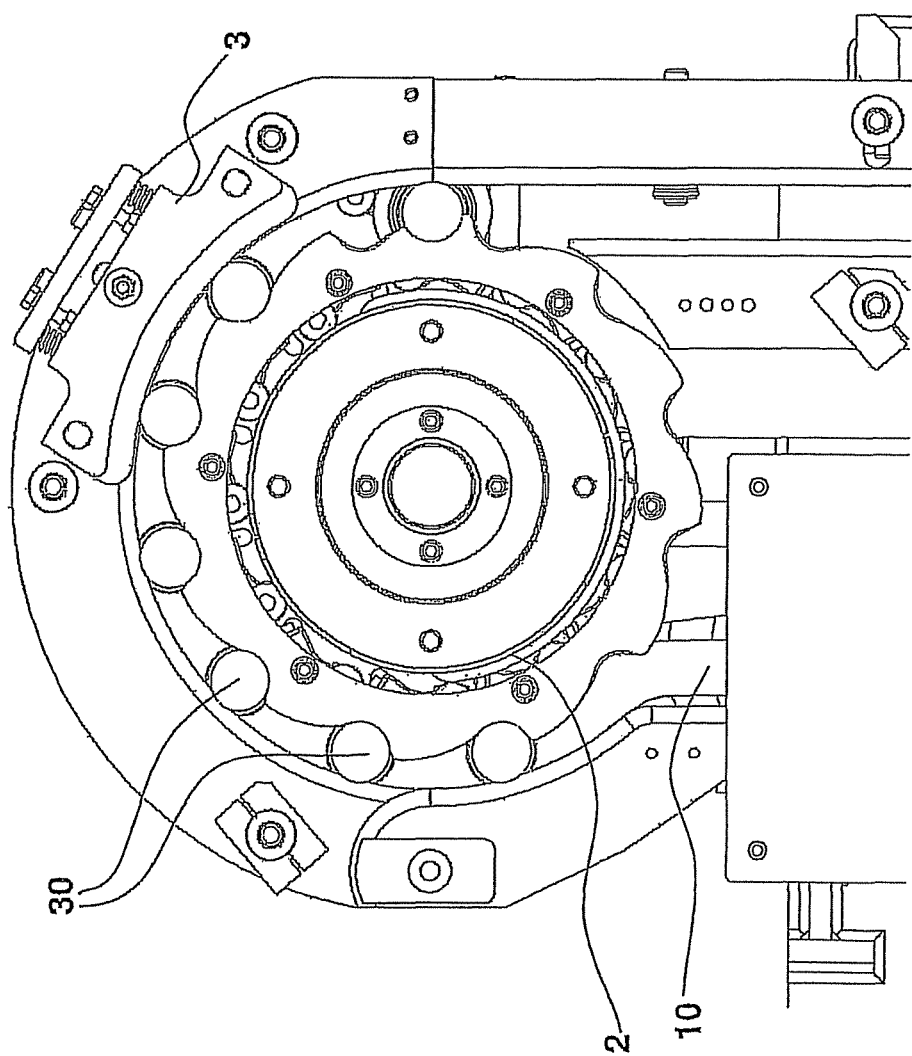
FIG. 2b is a bottom view of the loading drum of the conveying line of the system in FIG. 1.

Figures from 12 to 14 show an embodiment of a chuck 40, according to the present invention, comprising:

a body 11, which may be fastened to a link of the conveying chain, and completely made of plastic material, shown in FIG. 15;

a rotation pinion 12, arranged over the body 11;

a lifting plate 13, arranged between the pinion 12 and an upper abutting surface of the body 11;

a rotation pin 14, axially sliding through the body 11 and mechanically secured to a first end of pinion 12 and to the plate 13;

a quick fastening end 17 of the containers, e.g. preforms, mechanically secured to the second end of the pin 14;

a spring 15, arranged between the quick fastening end 17 and a lower abutting surface of the body 11.

Pinion 12, plate 13, pin 14 and quick fastening end 17 are integrally fixed to one another and may rotate about a common axis and/or translate along said common axis.

The rotation pinion 12 comprises a toothed or knurled zone 18 and a smooth zone 18' provided with an orientation notch 19.

The toothed or knurled zone 18 allows the coupling with a toothed belt or other suitable motion transmission means included in at least one zone of the conveying line in which the chucks, and thus the preforms or containers fastened thereto, are rotated, for example, to optimize the heating of the preforms before the first step of blow molding or, for example, for applying a coating or a paint on the containers. The orientation notch 19 may allow to define an angular position of the chuck on the conveying wheel of the line before gripping the preform or container to be transported.

In the preferred embodiment shown in the figures, the toothed zone 18 is the lower part of the pinion 12, while the smooth zone 18' is the upper part.

Other variants may include, instead, the toothed zone arranged in the upper part and the smooth zone arranged in the lower part of the pinion or, alternatively, the toothed zone arranged in a central section of the pinion and the smooth zone divided into two sections (upper and lower sections) spaced out by said central section, wherein at least one of said two sections is provided with the orientation notch.

Figure 11:
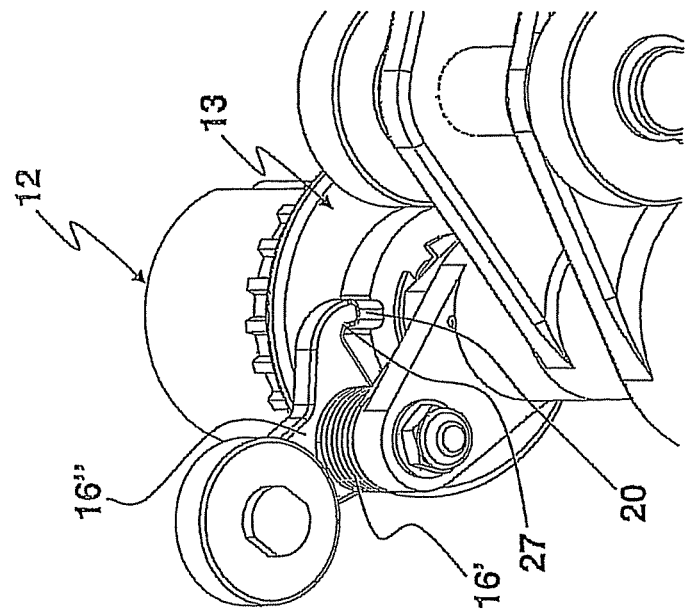
FIG. 11 is a view of the orientation means on the link of a conveying chain according to the present invention.
Figure 10:
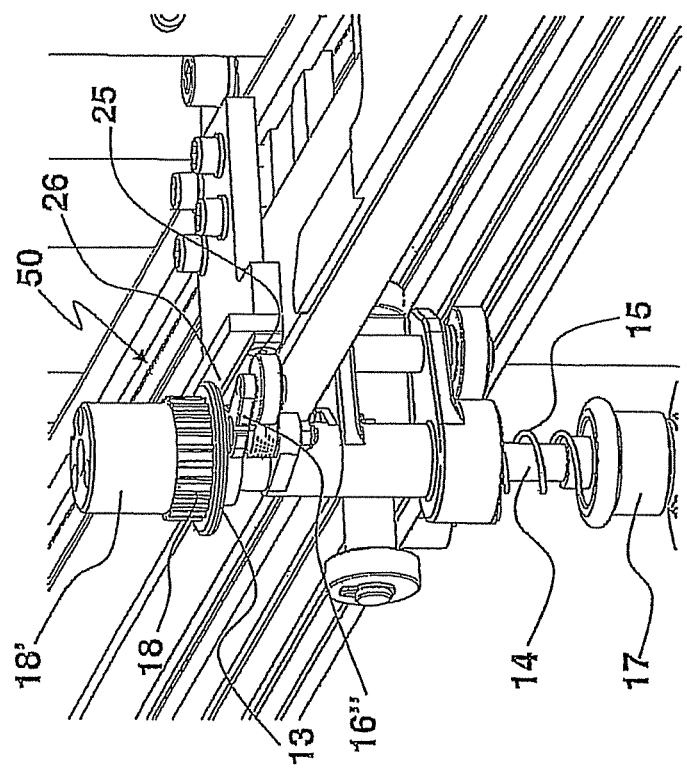
FIG. 10 is an axonometric view of the conveying chain link at the final orientation zone of the preforms.
Figure 13:
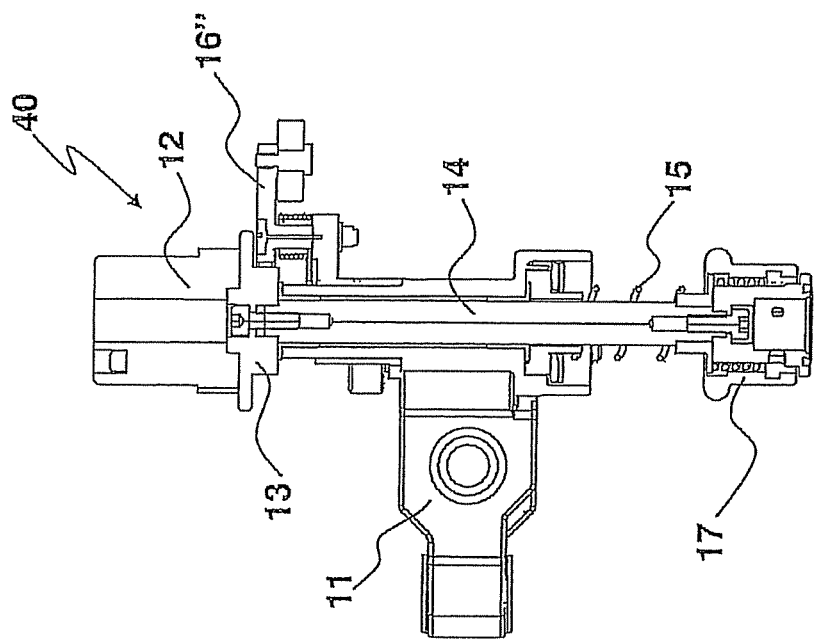
FIG. 13 is a cross section of the link in FIG. 12.
Figure 12:
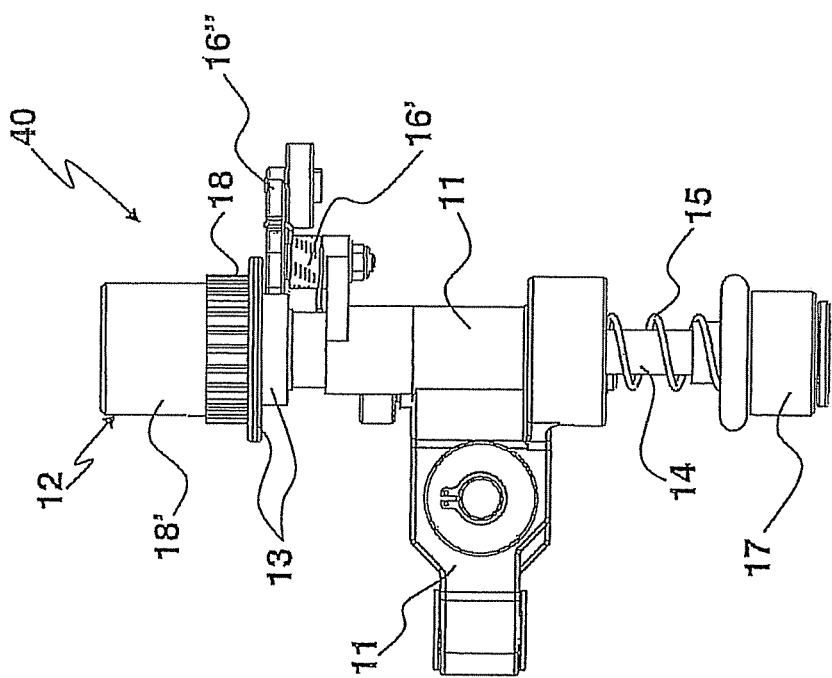
FIG. 12 is a side view of the a link of the conveying chain provided with a chuck according to the present invention.

The lifting plate 13 comprises two flat cylindrical sections (upper and lower sections) which are coaxial and have a different diameter. The lower cylindrical section, of smaller diameter, is provided with an orientation notch 20, shown in FIG. 11. The orientation notch 20 is provided to fix a predetermined angular orientation of the chuck in a predetermined step of conveying.

Such a plate 13 allows, by coupling the upper cylindrical section with a specific fixed cam guide or track in a part of the conveying line, to lift the whole chuck, after having released the preform or container, with respect to the plane on which the conveying circuit and thus the links of the conveying chain lay.

The plate 13 may also allow the chucks to rotate about an axis thereof, in the absence of friction in the toothed zone 18 of the pinion 12, operated by the friction between the base or the side surface of the upper cylindrical section of the plate 13 with a fixed cam track, arranged outside the conveying wheel. This rotation is used to orient the chucks on said conveying wheel by inserting respective bolts in the orientation notch 20.

The rotation pin 14, mechanically coupled to pinion 12 and lifting plate 13, serves the function of rotating and either raising or lowering the quick fastening end 17 and everything mechanically connected thereto. Lifting the rotation pin 14, and thus the quick fastening end 17, with respect to the plane on which the conveying chain moves, implies the compression of the spring 15. The elastic force of this compressed spring allows a quick lowering of the chuck at the zone in which the containers or preforms are fastened, after releasing the lifting plate 13 at the end of the specific fixed cam guide or track.

Finally, the quick fastening end 17 is provided with one or more mechanical parts, customized on a case-by-case basis according to the type of preform or container neck to be fastened and transported.

According to a further aspect of the invention, a conveying chain is advantageously included, comprising a plurality of links, in which a chuck 40 may be fastened to each link by means of the body 11 thereof.

A spring 16'/orientation lever 16" system, firmly connected to the body 11 of the chuck, is advantageously provided and adapted to allow an orientation of the chuck, and thus of preforms or containers fastened thereto, in a step of conveying. The orientation lever 16" is hinged on a pin, fixed to the body 11, about which the spring 16' is arranged, and is provided at a first end with a protuberance 27, e.g. formed as a bolt, adapted to be inserted into the orientation notch 20 provided on the lifting plate 13. At a second end of the lever 16", instead, a rounded part is provided serving as tappet element which, following the profile of a cam, provided along a track section of the conveying chain, operates the lever 16" by contacting the protuberance 27 with the lower cylindrical section of the plate 13 containing the notch 20. During this contact, the chuck is advantageously rotating about an axis thereof by the friction which is generated between the upper cylindrical section of the plate 13 and a contact zone on said track section. This rotation, which continues for a maximum angle of about 360°, allows the protuberance 27 to be inserted into the notch 20.

The spring 16', when the lever 16" is operated, exerts the necessary pressure force to insert the protuberance 27 into the notch or slot 20.

The notches or slots 19 and 20 are generally reciprocally offset but could however be also reciprocally aligned.

The body 11 of the chuck has rollers for a greater feeding stability of the chain along the conveying circuit track.

In an alternative variant, a single orientation notch may be provided on the chuck 40 provided on the rotation pinion or the lifting plate.

Example of Embodiment

FIG. 1 shows a layout of a conveying system for preforms of plastic material container comprising a conveying line and a linear-type blowing machine 9.

The preform conveying line comprises:
a loading chute 10;
a preform loading drum or wheel 1;
a conveying chain 4, defining a closed circuit, in which at least some links thereof include a chuck according to the invention for gripping and ejecting a respective preform;
conveying wheels 7, 7', on which the conveying chain runs;
at least one passing zone in which the preforms are free to rotate when fed, e.g. comprising at least one preform heating oven 5;
a preform orientation zone 6, possibly with varying pitch;
a feeding zone 8, possibly with varying pitch, of the oriented preforms towards the blowing machine 9.

In the embodiment of the system illustrated in FIG. 1, conveying chain 4 follows a circuit from the wheel 7 crossing the heating ovens 5 and the orientation zone 6 for then reaching wheel 7 again.

The preforms are fastened to the chain 4 by the chucks 40 in a cooperation zone of the wheel 7 with the loading drum 1, while the preforms are ejected from the chain 4 in a cooperation zone of the same wheel 7 with the orientation zone 6 of the preforms, which will subsequently be transported, by means of a feeding device, possibly with varying pitch, to the blowing machine 9.

A fixed cam guide or track 24, being substantially concentric semicircle-shaped and external to the wheel 7 in plan and arranged between these two cooperation zones, has a profile which includes a rise with respect to the plane of the closed conveying circuit, i.e. the plane on which the chain links run. Such a fixed cam guide or track allows to lift the chuck by means of a first chute, at an entrance zone of the chucks on the wheel 7, at a first end and to lower said chucks by means of a second chute, at the outlet zone of the chucks from said wheel 7, for fastening new preforms which rotate on the loading drum, at a second end.

A first orientation system of the preforms on the loading drum and/or a second orientation system of the chucks on the wheel 7 are advantageously provided. The orientation system for the preforms, provided on the loading drum 1, comprises a cam 2, arranged under the loading drum, adapted to operate positioning or orienting inserts 2' for the preforms, and a guide or fixed cam 3, arranged outside the loading drum and configured so as to generate a rotation of the preforms about an axis thereof by friction. These inserts 2' protrude from specific slots provided on the loading drum 1, so as to be able to directly cooperate, once operated, with the neck of the preforms when feeding them.

Figure 3:
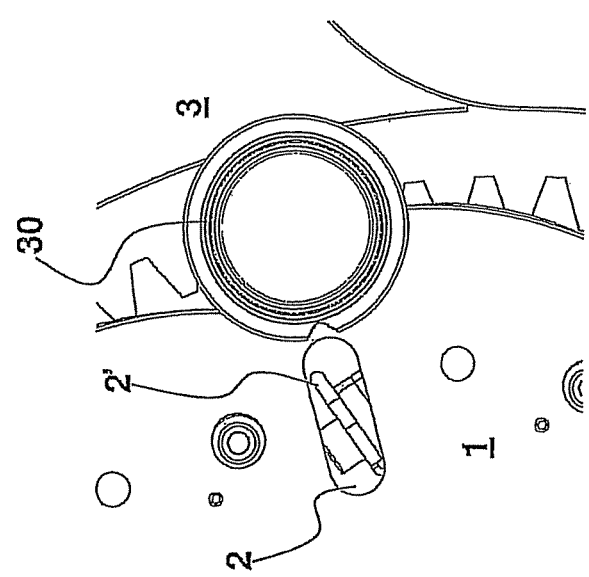

A preform 30, descending along the loading chute 10, enters the loading drum 1. During such a step, the cam 2 makes the corresponding positioning insert 2' retract with respect to the external rotation guide 3 of the preform (FIGS. 3 and 5a).

Figure 4:
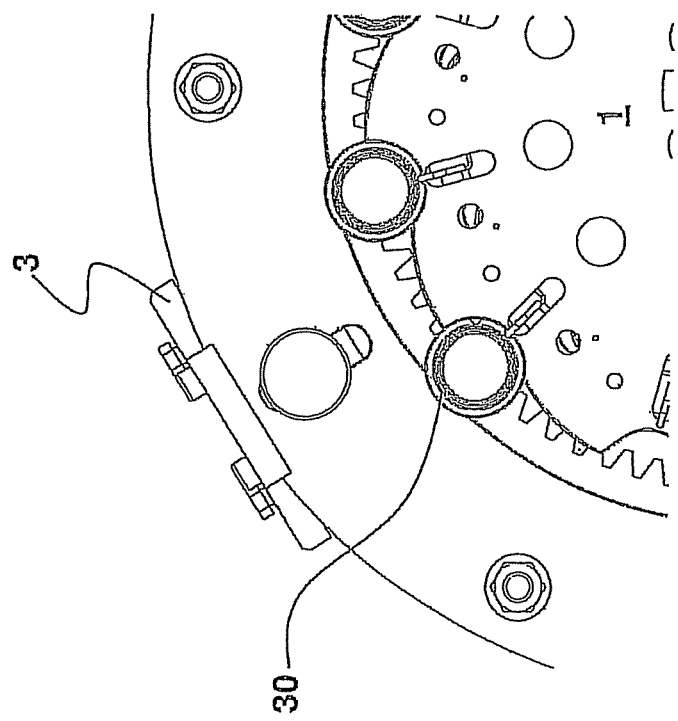
FIGS. 3 and 4 are enlarged views of parts in FIG. 2.

A friction is generated between preform 30 and external guide 3 during the rotation of the loading drum, which automatically produces the rotation of the neck of the preform about the axis thereof. The preform thus rotates and is fed at the same time. The insert 2' is concurrently operated by the cam 2, which creates a slight pressure on the neck of the preform 30 to meet an orientation notch 21 (FIGS. 4 and 5b) provided on the neck of the preform itself, e.g. on the annular protrusion or neck ring 31. At this point, the preform is perfectly oriented with respect to the loading drum 1. The orientation notch 21 may be provided at a starting point of the thread for screwing the cap or in another predetermined reference point.

Figure 5A:
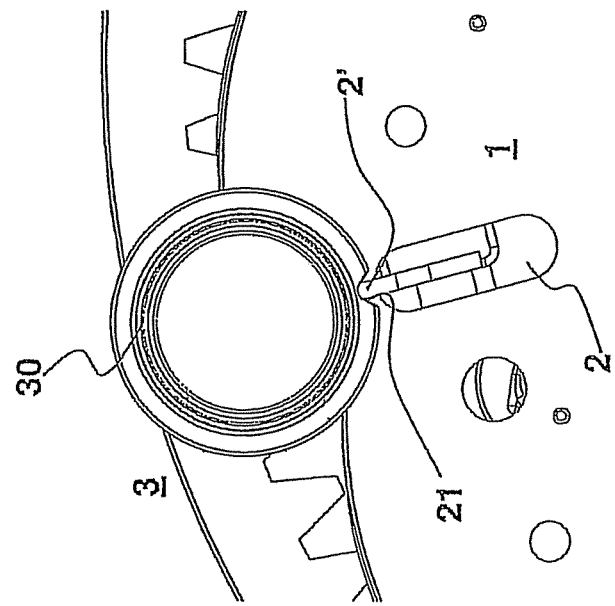
FIGS. 5a and 5b are top views of a preform in the loading drum in FIG. 2 in first and second positions, respectively.
Figure 5B:
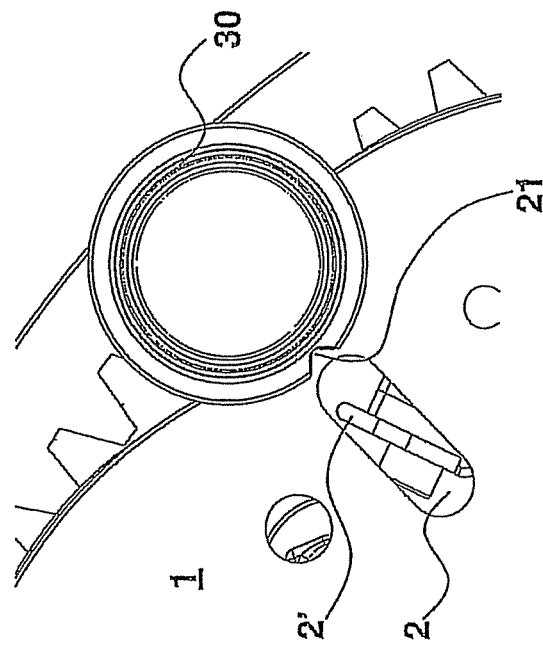
Figure 9:
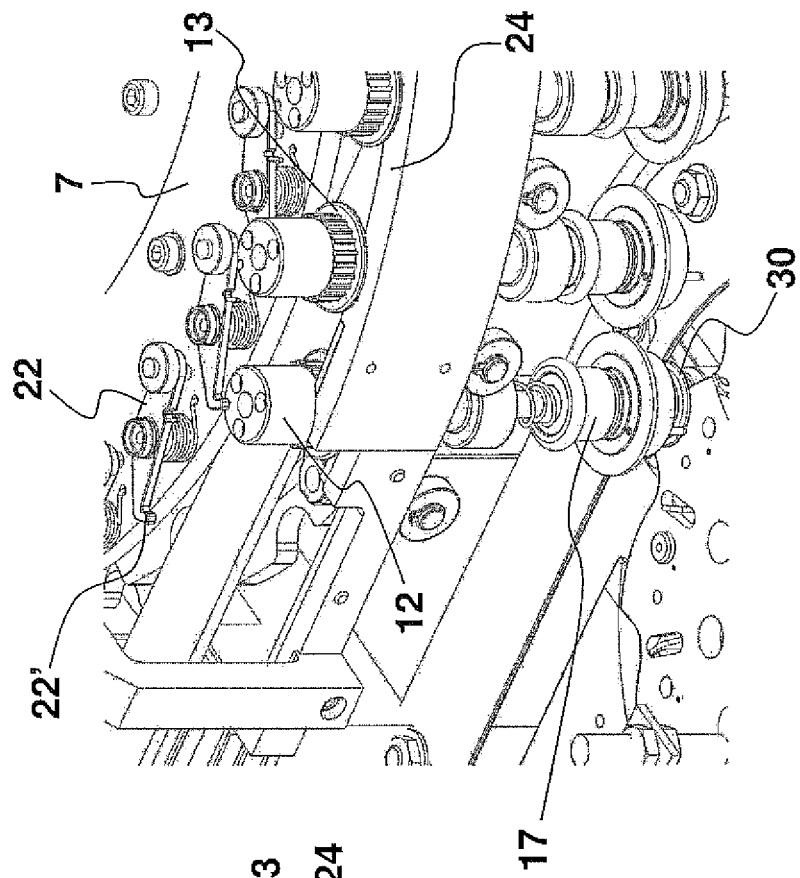
FIGS. 8 and 9 are axonometric views of different parts of the wheel in FIG. 6.
Figure 8:
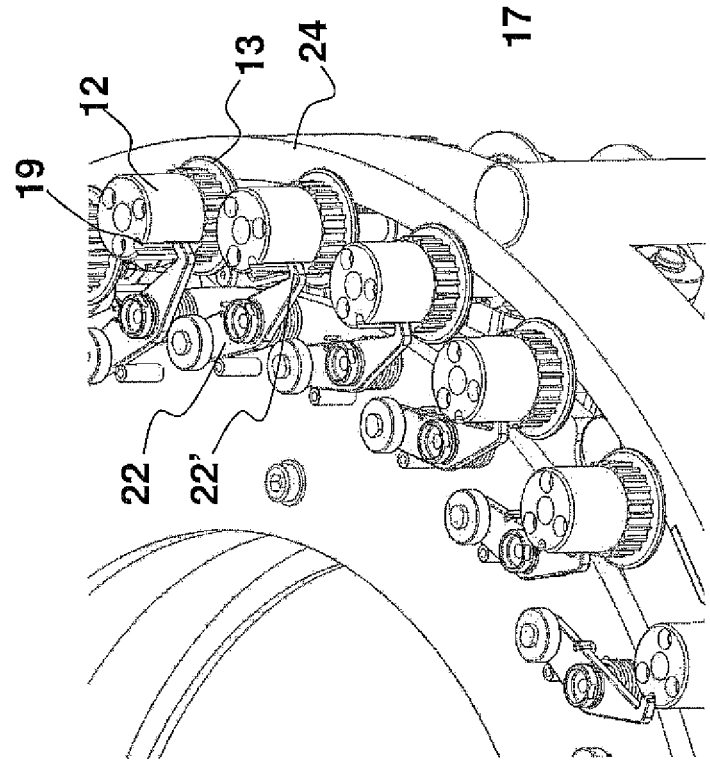

FIG. 5a shows a preform just loaded onto the loading drum with the corresponding insert 2' in a retracted position; FIG. 5b instead shows the same preform in a subsequent moment, with the insert 2' accommodated in the notch 21.

Following the orientation of the preform 30 on the loading drum 1, it is passed onto the conveying chain 4 by the chuck 40 according to the present invention fastening the preform 30.

The orientation system for chuck 40, provided on the wheel 7, comprises:
a plurality of levers 22, provided with respective protuberances 22', e.g. bolt-shaped, hinged and arranged along a circumference close to the outer edge of the wheel 7;

a cam 23, placed over the wheel 7 at the chain link inlet zone on said wheel, adapted to operate the levers 22 for orienting the existing chucks in at least some of the links of the chain.

Each bolt 22', when the chain 4 is fed about the wheel 7, thus presses on the rotation pinion 12 present on a corresponding link of the chain to meet the orientation notch 19. This operation is facilitated by the fact that when the chain 4 is fed, it rotates about itself by virtue of the fixed cam guide or track 24. Once the bolt 22' is inserted in the notch 19, the chucks keep a predetermined angular orientation to completely fasten the corresponding, previously oriented preforms which rotate on the loading drum.

The chucks 40 were previously oriented on the wheel 7 at the cooperation zone between the wheel 7 and the loading drum 1. The preforms are loaded in a descent zone of the conveying chain 4 at the end of the fixed cam track 24.

A vertical downward movement of the previously oriented chucks 40 allows the introduction of the customized quick fastening part thereof into the neck of the respective preforms, also rotating and already oriented on the loading drum 1.

The loading drum 1 and the wheel 7 are advantageously synchronized so as to ensure a perfect fastening of the preforms by the respective chucks.

At this point the preforms, inserted on the chucks, keep the orientation no longer with the loading drum but with respect to the respective chucks along the conveying circuit to their ejection from the chain 4.

Along this circuit, the integral chuck-preform pairs associated with at least one of the links of the chain 4 are advantageously free to rotate about a rotation axis when passing in at least one zone of said circuit comprising, for example, at least one oven 5 for an optimal thermal conditioning of the preform body, excluding the neck, for preparing the step of blowing. For example, in the different case of a conveying of previously blown containers, the passing zone in which the integral chuck-preform pairs, associated with at least some links of the chain 4, are free to rotate about a rotation axis comprises, for example, a system for applying a coating or paint.

This rotation is caused by the interference between the toothed zone 18 of each rotation pinion 12 and a toothed belt or other appropriate motion transmission means included in the ovens 5.

Once the orientation zone 6, possibly with varying pitch, has been reached the chucks are oriented again by the respective orientation levers 16", provided with respective protuberances 27 e.g. in the form of a bolt and provided on the respective links of the conveying chain.

A cam 25, placed on a section of feeding track 50 of the chain 4 close to the inlet zone on the conveying wheel 7, operates the orientation lever 16" so that the bolt 27 presses on the lower cylindrical section of the plate 13, while a contact zone 26 of the section of track 50 with the upper cylindrical section of the plate 13 allows the rotation of the plate itself, generated by friction, and thus of the pinion-plate-rotation pin-fastening end block forming the chuck, about the axis thereof. This rotation allows the bolt 27 to be inserted into the centering notch 20 of the lower cylindrical section of the plate 13. The latter orientation of the plate determines the final orientation position of the preform before it is ejected from the end 17 of the chuck.

The preforms are ejected at a predetermined angular orientation from the chain 4 by means of an ejection device which expels a predetermined number of preforms pushing them downwards into corresponding grippers. These grippers, each comprising two jaws which jointly define the shape of a cup, adapted to grip a preform over the neck ring, are actuated by a feeding device which, without making them rotate, transfers them through the zone 8 close to the machine or blowing press 9.

The feeding device advantageously is of the varying pitch-type when the distance between centers of the molds of the blowing machine 9 is greater than the distance between centers of the preforms in the conveying chain 4.

The varying-pitch feeding device arranges the oriented preforms at the blowing pitch and a transfer device then picks the preforms from the grippers and transports them to the mold of the machine or blowing press 9.

Lifting the chuck 40, at the inlet zone of the wheel 7, after having ejected the preform, occurs by means of the lifting plate 13 which allows the rotation pin 14 to be lifted by virtue of the shape of the aforesaid fixed cam guide or track 24.

Lifting the rotation pin 14 results in the compression of the spring 15.

The plate 13 further allows the rotation of the rotation pin 14 if the set consisting of pinion 12, lifting plate 13 and pin 14 itself is present in a raised position and without any friction on the toothed zone 18 of the pinion 12. In this case, the rotation of the chucks about an axis thereof is operated by the friction between the base or side surface of the upper cylindrical section of the plate 13 and the fixed cam track 24. This rotation serves to orient the chucks again with respect to the loading drum by means of a plurality of levers 22 provided with bolt 22', and of fixed cam 23.

Once the descent zone has been reached for fastening new preforms, the spring 15 allows the rapid descent of the chuck after releasing the lifting plate 13 at the end of the fixed cam track 24.

The conveying cycle thus starts again from the fastening of new preforms by the loading drum.

Appropriate control means are advantageously included, comprising for example stopper devices adapted to check the position of inserts 2' and bolts 22' which identify the orientation of preform and chuck, respectively. Thereby, it is possible to check whether the preforms and chucks are correctly oriented.

The described orientation system, by virtue of chucks and conveying chain of the present invention, thus allows to obtain a precise orientation of the preforms to be inserted into the molds of the blowing machine with low costs without needing to include complex, highly expensive, mechanical control systems.

A further advantage is that the orientation angle may be simply changed by intervening on the fixing means, e.g. screws, which fix the smooth zone 18' of the rotation pinion 12, provided with the orientation notch 19, to the lifting plate 13.

The invention claimed is:

1. A chuck for actuating plastic material containers, in particular preforms, along a conveying line, comprising:
   a structure, fixable to a link of a conveying chain,
   a body, defining a longitudinal axis, inserted into a longitudinal through hole of said structure and adapted to axially slide and/or rotate about said axis, provided with gripping means at a first end for gripping a container neck,
   wherein the structure is provided with locking means for locking said body in a predetermined angular position relative to the longitudinal axis,
   and wherein the body is provided with at least one indication element (20) of said predetermined angular position.

2. The chuck according to claim 1, wherein said locking means comprise a spring-lever system adapted to cooperate with said at least one indication element.

3. The chuck according to claim 1, wherein said body is provided with a further indication element of a predetermined angular position.

4. The chuck according to claim 3, wherein said further indication element is a further slot provided on a cylindrical side surface of a second part of said body, arranged over a first part of said body, which is outside over the structure.

5. The chuck according to claim 4, wherein said second part of the body comprises a lower zone adapted to interfere with motion transmission means and an upper zone wherein said further slot is provided.

6. A conveying chain for plastic material containers, in particular preforms, comprising a plurality of links, wherein at least one chuck for actuating plaster material containers, in particular preforms, along a conveying line is fixed to a link of the conveying chain, the chuck comprising
   a structure, fixable to the link of the conveying chain,
   a body, defining a longitudinal axis, inserted into a longitudinal through-hole of said structure and adapted to axially slide and/or rotate about said axis, provided with gripping means at a first end for gripping a container neck, and
   wherein the structure is provided with locking means for locking said body in a predetermined angular position relative to the longitudinal axis, and the body is provided with at least one indication element (20) of said predetermined angular position.

7. A chuck for actuating plastic material containers, in particular preforms, along a conveying line, comprising:
   a structure, fixable to a link of a conveying chain,
   a body, defining a longitudinal axis, inserted into a longitudinal through hole of said structure and adapted to axially slide and/or rotate about said axis, provided with gripping means at a first end for gripping a container neck,
   wherein the structure is provided with locking means for locking said body in a predetermined angular position,
   and wherein the body is provided with at least one indication element of said predetermined angular position,
   wherein said locking means comprise a spring-lever system adapted to cooperate with said indication element, and
   wherein said indication element is a slot (20) provided on a side surface of a first part of said body, which is outside over the structure.

8. The chuck according to claim 7, wherein the lever is provided at a first end with a protuberance adapted to be inserted into said slot.

9. The chuck according to claim 8, wherein the lever is provided at a second end with a tappet element adapted to follow the profile of a cam on the track of the conveying chain so as to operate said lever to contact the protuberance with said first part of the body.

10. The chuck according to claim 9, wherein the lever is hinged onto a pin, fixed to the structure, about which a spring is arranged, adapted to exert the pressure force necessary to insert the protuberance into the slot.

\* \* \* \* \*